Figure 25:
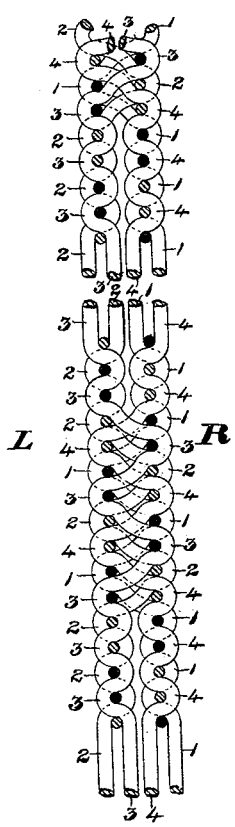

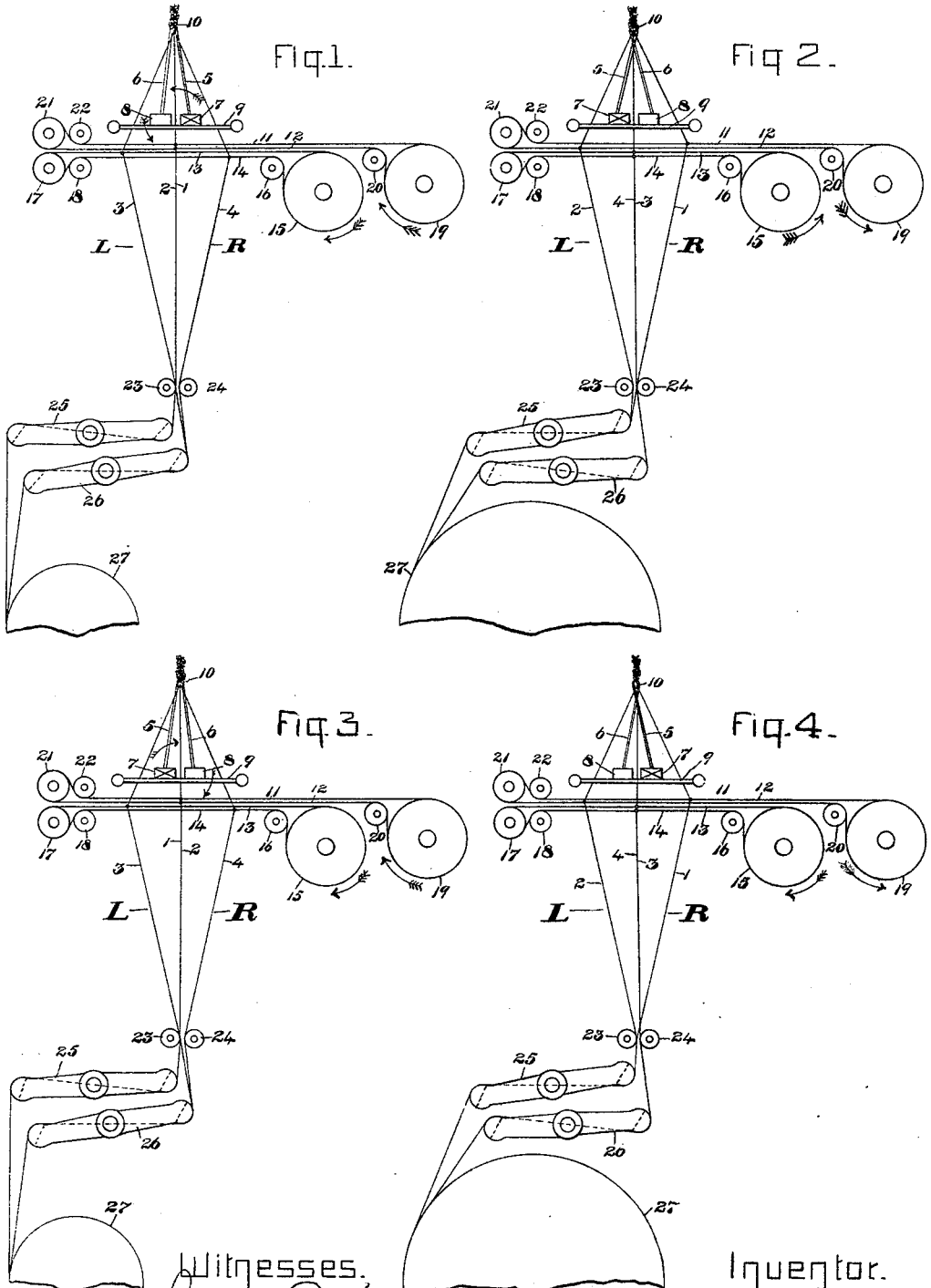

(No Model.) 5 Sheets—Sheet 2.
A. D. EMERY.
METHOD OF WEAVING SEAMLESS BAGS.
No. 415,149. Patented Nov. 12, 1889.
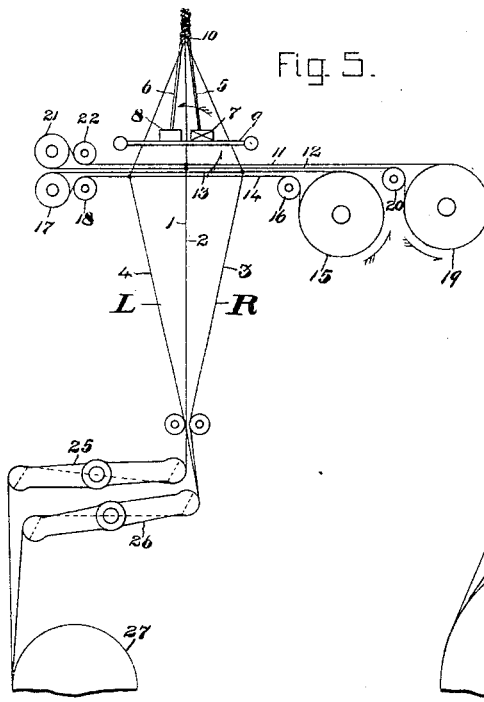
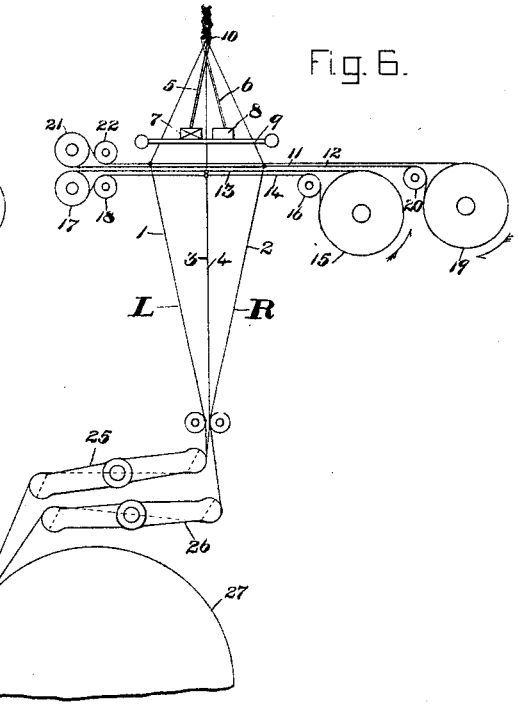
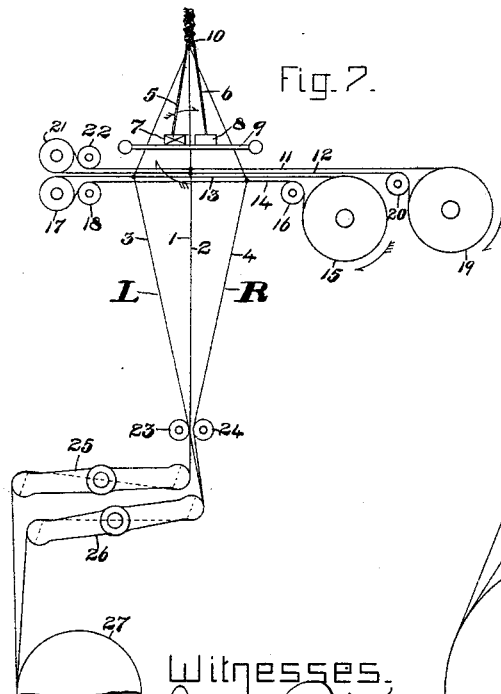
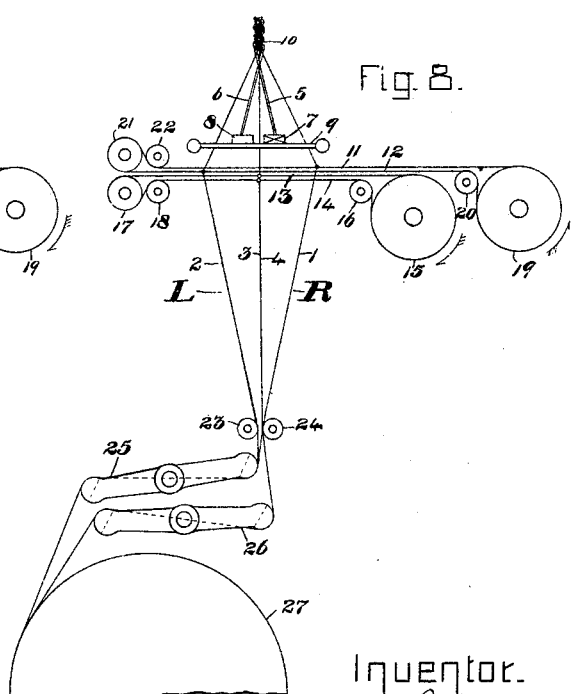

(No Model.) 5 Sheets—Sheet 3.
A. D. EMERY.
METHOD OF WEAVING SEAMLESS BAGS.
No. 415,149. Patented Nov. 12, 1889.
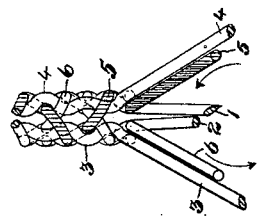
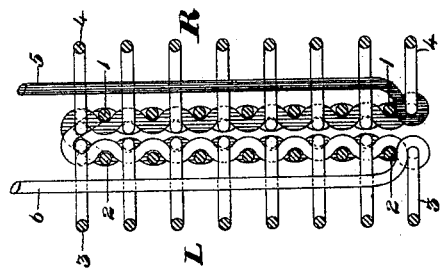
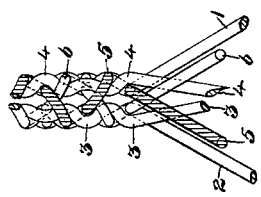
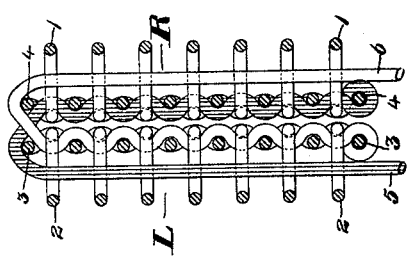
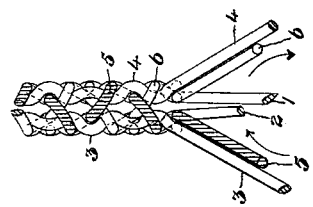
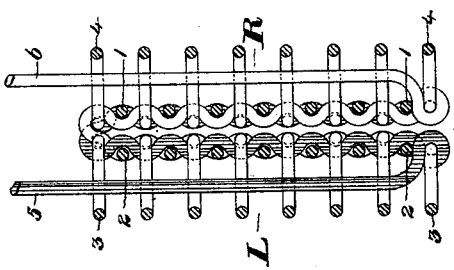
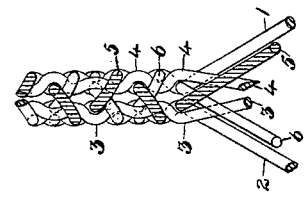
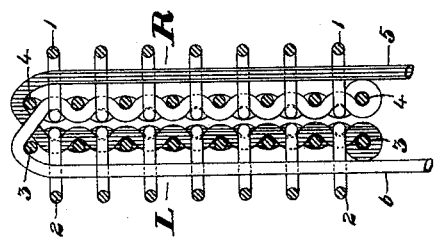
Witnesses.
Inventor.
Abram D. Emery
by
Frank Mc Arthur
Attorney.

(No Model.) 5 Sheets—Sheet 4.
A. D. EMERY.
METHOD OF WEAVING SEAMLESS BAGS.
No. 415,149. Patented Nov. 12, 1889.
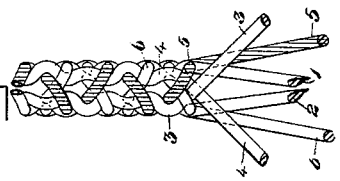
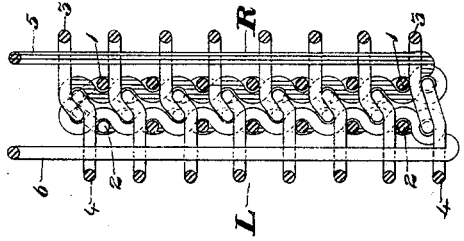
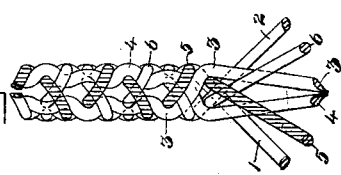
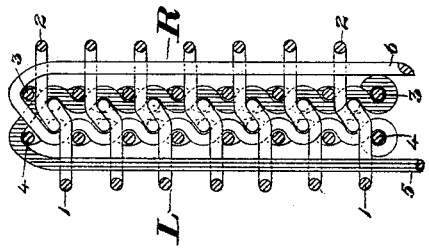
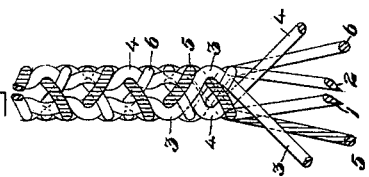
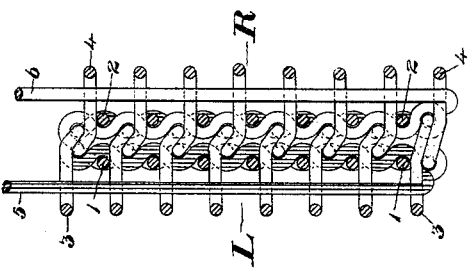
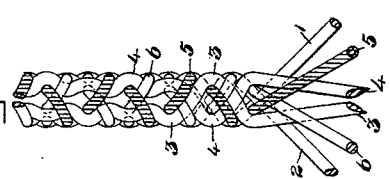
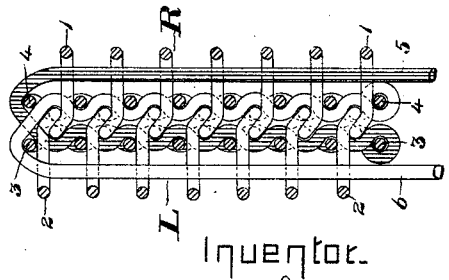
Witnesses
Leontine Franc
Gertrude Ward
Inventor
Abram D. Emery
by
Frank MacArthur
Attorney (No Model.)

A. D. EMERY.
METHOD OF WEAVING SEAMLESS BAGS.

No. 415,149. Patented Nov. 12, 1889.

5 Sheets—Sheet 5.

Witnesses.

Inventor.
Abram D. Emery
by
Frank MacArthur
Attorney.

UNITED STATES PATENT OFFICE.

ABRAM D. EMERY, OF TAUNTON, MASSACHUSETTS.

METHOD OF WEAVING SEAMLESS BAGS.

SPECIFICATION forming part of Letters Patent No. 415,149, dated November 12, 1889.

Application filed May 31, 1889. Serial No. 312,827. (No model.)

*To all whom it may concern:*

Be it known that I, ABRAM D. EMERY, a citizen of the United States, residing at Taunton, in the county of Bristol and State of Massachusetts, have invented a certain new and useful Method of Weaving Seamless Bags, of which the following is a full description.

My invention relates to a method of weaving seamless bags, and has for its object the more rapid production of the same, which object is accomplished, generally speaking, by simultaneously passing two weft-threads through the sheddings prepared for them, thus forming the two halves or sides at one operation. The bottom of the bag is formed by reversing the position of the shuttles on that side and returning them through the opposite sides to those just traversed. The mouth of the bag is formed by returning each weft-thread through the same side around the outer chain-thread of that side, thus forming two selvages which constitute the mouth of the bag. The two halves or sides are bound together by interlacing the two weft-threads and all the chain-threads in such a manner that the chain-threads of one side pass to the outside of the opposite side in regular order around the two weft-threads, thus forming one piece of fabric at this point. This interlacing is continued for a distance required to form the binding for two bags when the weaving of the two sides separately is repeated for the requisite distance to form the width of the bag, and then the two sides are again bound together, as before, and then again woven separately, as before, and the operation continued indefinitely, forming an endless chain of seamless bags. Upon cutting through the center of the interlacings the separate bags are obtained, having the mouth or opening formed by the two selvages, the bottom by the crossing of the two weft-threads, and the sides by the interlacing of the weft-threads with all the chain-threads. In this method one or two chain-rolls may be used, as desired. I have illustrated the same with one roll, as set forth in an application for weaving two pieces of fabric from one chain-roller filed by me May 31, 1889, Serial No. 312,828, Case 13. This invention is, in short, the method of forming a bag with two shuttle-threads, in which the mouth is formed by simultaneously forming the selvages on one side and passing the shuttles by each other on the other side to form the bottom, and then weaving the parts together in regular order at the proper distances, thus closing the three sides and leaving an opening in one side. It will also be observed in this process that the weft-threads pass lengthwise, while the chain-threads pass across the bag in the process of formation.

Figure 26:
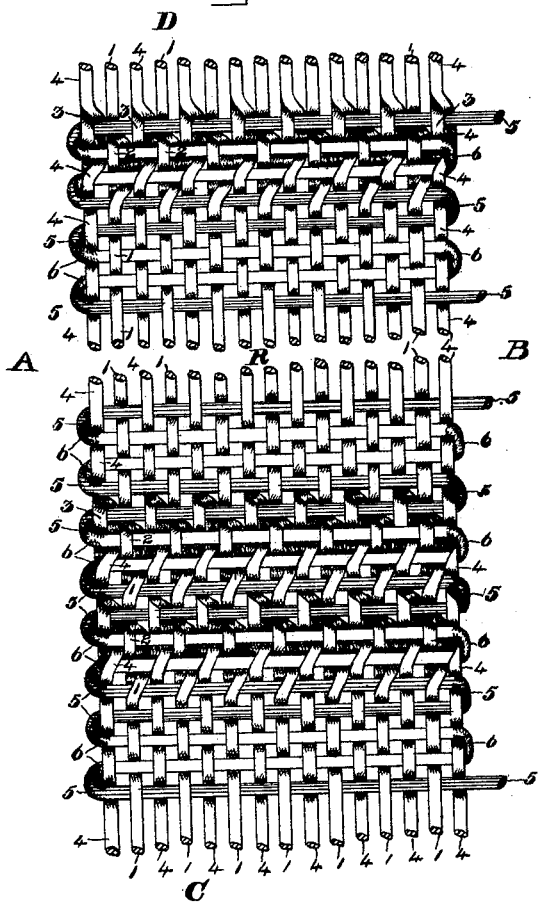

In the accompanying drawings, forming part of this specification, Figures 1, 2, 3, and 4, Sheet 1, represent diagrammatically the component parts of a loom, showing the four sheddings requisite for forming the open part of the bag, or that in which the two parts are woven open on one side of the bag and closed at the bottom or opposite side. Figs. 5, 6, 7, and 8, Sheet 2, in like manner represent the four sheddings requisite for binding the two parts together. Figs. 9, 11, 13, and 15 of Sheet 3 illustrate enlarged sections of the four sheddings, as shown in Figs. 1 to 4 of Sheet 1. Figs. 10, 12, 14, and 16 of Sheet 3 illustrate enlarged end views of the several sheddings of Figs. 9, 11, 13, and 15 of Sheet 3, and of Figs. 1 to 4, Sheet 1, taken from the side upon which the weft-threads pass by each other to form the bottom of the bag. Figs. 17, 19, 21, and 23 of Sheet 4 represent enlarged sections of the sheddings, as illustrated in Figs. 5 to 8 of Sheet 2, and show the position the threads assume in forming the interlacing of the two sides of the fabric. Figs. 18, 20, 22, and 24, Sheet 4, represent edge views of the sheddings of Figs. 17, 19, 21, and 23, taken on the side where the weft-threads cross each other in their passage to the opposite sides. Fig. 26 of Sheet 5 is a partial plan view of the bag with the several threads separated to show the formation of the same, the bottom or closed side being designated by the letter A, the open side by the letter B. Fig. 25 of Sheet 5 is a vertical cross-section of the fabric shown in Fig. 26, taken on the line C D, looking toward the side B or opened or mouth side of the bag.

To better distinguish the two weft-threads, one is shown shaded and the other plain in all the views.

Referring to Figs. 1 to 8, Sheets 1 and 2, numerals 1, 2, 3, and 4 represent the four chain-threads, threads 1 and 4 being the threads used to form the right-hand side of the fabric and 2 and 3 of the left-hand side. The threads 3 and 4 pass over the equalizing-lever 26 and the threads 2 and 3 pass over the equalizing-lever 25, which two combined form the whip-roller. These threads pass between rollers 23 and 24, which keep the threads forming the outside of the sheddings at an equal tension, as more fully explained by me in an application filed May 31, 1889, Serial No. 312,828, Case 13.

Numeral 5 designates the shaded weft-thread shown attached to shuttle 7, and numeral 6 the plain weft-thread attached to shuttle 8.

9 is the reed through which the chain-threads pass, and 10 the finished fabric in process of formation.

Thread 1 passes through an eye in heddle-cord 11 and thread 2 passes through heddle-cord 12, thread 3 passes through heddle-cord 13, and thread 4 passes through heddle-cord 14. The heddle-cords 11 and 12 are connected together and pass over and around the large roller 19, which has an oscillating motion, so as to place the heddle-eyes in either position desired. The opposite end of the heddles pass around the roller 21. The bending-roller 22 keeps the heddles in alignment with the top of roller 19, and bending-roller 20 likewise aligns the other heddle with roller 21. The heddles 13 and 14 are in like manner passed around the large oscillating roller 15 and the opposite end around the roller 17. The bending-rollers 18 and 16 align the heddle 14.

The numeral 27 represents the roll of chain.

Referring particularly to Fig. 1, it will be seen that the heddle 14 is at the extremity of its motion, the chain-threads 4 opened out to the side marked R, while the heddle 13, which is a continuation of heddle 14, is in the opposite extremity of the motion, through the eye of which chain-thread 3 is opened out to the side marked L. This forms the first double shedding.

The shuttles are represented as being in the rear stationary boxes with their threads attached thereto and extending to the selvage sides of the bag in the rear of the loom. The shuttles are now driven through these openings, and the weft-threads are shown in place in enlarged view Fig. 9 and enlarged view Fig. 10, Sheet 3, where the shaded thread 5 is between the threads 4 and 1 on the side marked R and the plain thread 6 is between the threads 3 and 2 on the side marked L. The weft-threads are then beaten up into the fabric and form the first pick. The rollers 15 and 19, Fig. 1, are now moved in the direction indicated by the arrows in Fig. 1 and bring the heddles in the position shown in Fig. 2, Sheet 1, with chain-thread extended on the side R and 2 on the side L, with 3 and 4 in the center. The shuttles are turned in the direction indicated by the arrows in Fig. 1 into the position shown in Fig. 2, and are then driven to the back of the loom through the sheddings as formed, and the weft-threads are shown in position in Fig. 11, Sheet 3, wherein the shaded thread 5 is shown between threads 2 and 3 and plain thread 6 between threads 1 and 4. The manner of the crossing of the threads 6 and 5 is shown in enlarged side view, Fig. 12, Sheet 3, as fully explained in my application filed February 28, 1888, Serial No. 265,639, Case 1. The threads 5 and 6 of the previous pick are also shown beaten up in Fig. 11. The weft-threads are now beaten up and form the second pick. The heddles are shifted by moving the rollers, as indicated by the arrows in Fig. 2, to the position shown in Fig. 3, Sheet 1, which is the same as shown in Fig. 1, with the chain-threads 3 and 4 extended on the sides L and R, with threads 1 and 2 in the center. The shuttles are driven from the rear to the front boxes through the sheddings, and the weft-threads are shown in position in Fig. 13, Sheet 3, which is same as Fig. 9, except that the weft-threads have changed sides. This is also seen in enlarged view, Fig. 14. The weft-threads are now beaten up into the fabric and form the third pick. The heddles are now passed into the position indicated in Fig. 4 by moving the rollers 15 and 19 in the direction indicated by the arrows in Fig. 3, which places the threads in position as in Fig. 2, the threads 1 and 2 being on the sides R and L, with the threads 3 and 4 in the center. The shuttles are turned in the direction indicated by the arrows in Fig. 3 to the position in Fig. 4 and are driven across to the rear stationary boxes through the sheddings. The weft-threads are shown in position in Fig. 15, Sheet 3, which is the same as Fig. 11, except that the weft-threads are on opposite sides. The position of the threads as they cross is shown in Fig. 16, which is the opposite of the first transfer, as shown in Fig. 12, thus always bringing the same thread on the outside. The thread being beaten up forms the fourth pick. This process is continued for the length desired to form the width of the bag, and it will be observed that the open side or mouth is formed on the right by passing the weft-threads around the chain-threads 3 and 4, which are the outside chain-threads on that side, and then returning the weft-threads through the same sides of the fabric in which they were passed from the closed side to and around the chain-threads 3 and 4. The bottom is formed by crossing the threads and transferring them from one side to the other into the succeeding shedding, as shown in Figs. 12 and 16, Sheet 3.

In Fig. 5 is shown the first shedding used to bind the two sides together, and is formed by turning the rollers 15 and 19, as shown in Fig. 4, Sheet 1, in the direction indicated by the arrows, which places thread 3 on the outside of the side R, and thread 4 on the outside of side L, thus carrying the thread 4 from the side R to the side L and thread 3 from the side L to the side R, with the threads 1 and 2 in the center. Through these sheddings the shuttles are passed from the rear to the front boxes, and the weft-threads are shown in place in the enlarged views, Fig. 17, Sheet 4, wherein thread 5 is between threads 3 and 1, and thread 6 between threads 4 and 2. It will be seen that thread 5 in passing the selvage or right-hand chain-threads now passes around thread 3 and thread 6 passes around thread 4. The position of the threads will be seen in enlarged view, Fig. 18. The weft-threads are beaten up and form the first pick of binding. The heddles are moved to form the next shedding by turning the rollers 15 and 19 in the direction indicated by the arrows, as shown in Fig. 5, Sheet 2, and are shown in position in Fig. 6, wherein the threads 1 are on the side L and threads 2 on the side R, with 3 and 4 in the center. The shuttles are turned in the direction indicated by the arrows in Fig. 5, and passed through the sheddings to the rear, as shown in Fig. 6. The position of the threads in the fabric is shown in enlarged view, Fig. 19, where thread 6 is on the side R between the threads 2 and 3, and thread 5 is on the side L between the threads 1 and 4. Their position in crossing is shown in Fig. 20. The threads are beaten up and form the second pick. The heddles are now moved to form the third shedding by turning the rollers 15 and 19 in the direction indicated by the arrows in Fig. 6 to the position shown in Fig. 7, in which the thread 4 is extended on the side R, and thread 3 is extended on the side L, with the threads 1 and 2 between. Through these sheddings the shuttles are passed, carrying the weft-threads from rear to front, and the weft-threads are seen in position in Fig. 21, in which thread 6 is between threads 2 and 4, and thread 5 is between 1 and 3. These will be also seen upon examining Fig. 22, Sheet 4. The weft-threads are now beaten up and form the third pick of binding. The heddles are now moved by turning the rollers 15 and 19 in the direction indicated by the arrows in Fig. 7 to the position shown in Fig. 8, Sheet 2, in which it will be seen that thread 1 is extended on the side R, and the thread 2 is extended on the side L, with threads 3 and 4 in the center. The shuttles are turned in the direction indicated by the arrows in Fig. 7, and passed through the sheddings to the rear, as shown in Fig. 8, Sheet 2, and the weft-threads will be seen in position in Fig. 23, Sheet 4, in which the thread 5 is between threads 1 and 4 and thread 6 between 2 and 3. The position of the threads 5 and 6 in crossing is seen in Fig. 24. These threads, being beaten up, form the fourth pick of the binder, which is continued for the length desired for the binding the sides of two bags when the regular order of the sheddings of Figs. 1 to 4, Sheet 1, are worked over a sufficient number of times to form the width of the bag, when the binding is again worked over, as shown in Figs. 5 to 8, Sheet 2, for double the length required to bind the sides together. Upon separating the fabric in the center of the interlaced portions separate seamless bags are produced. The direction taken by the chain and weft threads on the side where the transferring takes place to form the bottom of the bag will readily be seen upon examination of edge views 10, 12, 14, and 16, Sheet 3, which show the manner of passing while the two sides are being formed, and Figs. 18, 20, 22, and 24 show the direction taken during the process of forming the bottom in conjunction with the direction taken during the process of binding.

In Fig. 26, Sheet 5, is shown a plan view of the fabric as made. Beginning at the top, there are four picks of binder shown as made by sheddings. (Shown in Figs. 5 to 8, Sheet 2.) The next four picks form the two sides of the bag separated, with the side B open and the side A closed, as formed by sheddings of Figs. 1 to 4. The fabric is then shown as broken away and the next four picks are a repetition of the last four, thus showing the beginning and ending of the weaving of the width of the bag. The next eight picks are binder, as first described, and then come four picks of sides. I have shown four picks of binder on each side of the bag, which in practice will be repeated the length desired, the length woven of sides and binder being understood as being multiples of four.

Fig. 25, Sheet 5, is a section of the bag through the points C D, looking toward the side B, and shows the direction taken by each of the chain-threads as well as the open part on the side B, the side A being always closed.

The bag made by the method of the present case is the subject of another application filed by me May 31, 1889, Serial No. 312,826, (Case 11,) and forms no part of this present invention. The present invention is also to be distinguished from the method of weaving seamless bags which is the subject of application Serial No. 318,249, filed July 22, 1889, (Case 20,) which method produces the bags, which are the subject of application Serial No. 312,833, filed by me May 31, 1889, (Case 18,) and I make no claim in this specification to such method or such bags. In the present case the bags are made with selvage-edges at the mouth, as in the applications referred to, with the two sides bound together by interlacing all the chain-threads with the two weft-threads, and with the weft-threads transferred to opposite positions in the fabric at the bottom of the bag at each second pick, all as in the applications referred to. In this case, however, the weft-threads are not interlaced with all the chain-threads at the bottom of the bag, and it is this special feature which, as compared with the applications referred to, is the subject of the present application.

I make no claim herein to the method of weaving double-weight fabrics which is involved in the interweaving of the two sides of the bag to form the closed ends of the same. This method is merely incidental to the method of weaving bags which is the subject of the present application, and forms the subject of another application filed by me October 7, 1889, No. 326,247, method of weaving double-weight goods, (Case 25.)

What I claim is—

The method of weaving seamless bags, which consists in forming an opening or shed in the two halves of a set of chain-threads, then simultaneously introducing a weft-thread into each of the openings or sheds so formed from the two selvages on one side of loom forming the mouth of the bag to the opposite side of the loom, then repeating the shedding operation, then passing the weft-threads by each other and through opposite sides of the bag to those just traversed and to the selvage side of the loom, thus closing the bottom, repeating the shedding and passing the weft-threads through the halves just traversed, repeating the shedding operation and passing the weft-threads by each other and through the opposite sides of the bag to the selvage side of the loom, and continuing these operations for the length desired, then shedding the chain-threads and passing a given portion of the same to opposite sides of the bag and passing the weft-threads through the same, repeating the shedding and passing the weft-threads through the sides just traversed, repeating the shedding and passing the weft-threads by each other into the opposite sides of the bag, continuing this process for double the length required to bind the two sides together, and then repeating the process of weaving separate sides and then binding together, forming an endless chain of bags side by side.

In testimony whereof I have hereunto set my hand this 29th day of May, A. D. 1889.

ABRAM D. EMERY.

Witnesses:
WM. T. DONNELLY,
WALTER T. EMERY.